US006859560B2

(12) United States Patent
Fujiwara et al.

(10) Patent No.: US 6,859,560 B2
(45) Date of Patent: Feb. 22, 2005

(54) IMAGE SIGNAL ENCODING DEVICE AND IMAGES SIGNAL ENCODING METHOD (75) Inventors: Yuji Fujiwara, Nishinomiya (JP); Masakazu Nishino, Kashiwara (JP); Mitsuhiro Miyashita, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 553 days.

(21) Appl. No.: 09/811,661

(22) Filed: Mar. 19, 2001

(65) Prior Publication Data

US 2001/0024527 A1 Sep. 27, 2001

(30) Foreign Application Priority Data

Mar. 17, 2000 (JP) ........................................ 2000-075790

(51) Int. Cl.$^7$ ............................................... G06K 9/36
(52) U.S. Cl. ..................................................... 382/239
(58) Field of Search ................................ 382/232, 236, 382/238, 239, 248, 250; 358/426.06, 426.07, 426.11; 348/384.1, 394.1, 395.1, 400.1–404.1, 407.1–416.1, 420.1, 421.1, 425.2, 430.1, 431.1; 375/240.02, 240.03, 240.12–240.16, 240.18, 240.2, 240.22–240.25

(56) References Cited

U.S. PATENT DOCUMENTS

| 5,214,507 A | * | 5/1993 | Aravind et al. .......... 348/390.1 |
| 5,253,059 A | | 10/1993 | Ansari et al. |
| 5,440,345 A | * | 8/1995 | Shimoda ................ 375/240.14 |
| 5,734,783 A | * | 3/1998 | Shimoda et al. ............... 386/68 |
| 5,805,933 A | * | 9/1998 | Takahashi ..................... 710/72 |
| 5,870,145 A | * | 2/1999 | Yada et al. ............ 375/240.04 |
| 6,201,898 B1 | * | 3/2001 | Takeuchi et al. ............ 382/251 |

FOREIGN PATENT DOCUMENTS

| EP | 0 822 724 | 2/1998 |
| JP | H7-234263 | 9/1993 |
| JP | H7-23423 | 1/1995 |

OTHER PUBLICATIONS

Partial European Search Report corresponding to application No., EP 01 10 6712 dated Sep. 15, 2004.

J. L. Mitchell et: al., "MPEG Video Compression Standard", MPEG Video Compression Standard, Chapman and Hall Digital Multimedia Standards Series, pp. 135–165, XP 002118039, 1996.

Zhu Xiuchang et al., "A Multi–Standard Video Codec Scheme Based on the AxPe1280V Chip", Journal of Nanjing University of Posts and Telecommunications, vol. 18, No. 5–6, XP002290496, 1998. (English abstract only).

"XP–002290497", Journal of Nanjing University of Posts and Telecommunications, XP–002290497 dated Jul. 29, 2004. (English abstract only).

(List continued on next page.)

*Primary Examiner*—Jose L. Couso
(74) *Attorney, Agent, or Firm*—RatnerPrestia (57) ABSTRACT

An image signal encoding device has at least encoding means of dividing a luminescence signal and color-difference signals of image signals into macro blocks having a plurality of sub macro blocks and encoding data of the macro blocks with use of any one of a plurality of compression modes of which compression rate is different each other, wherein the total numbers of sub macro blocks in the each macro block are the same for the use of the all kinds of compression modes.

21 Claims, 3 Drawing Sheets

OTHER PUBLICATIONS

P.H.N. de With et al, Digital Consumer HDTV Recording Based on Motion–Compensated DCT Coding of Video Signals', Signal Processing: Image Communication, vol. 4, No. 4/5, pp. 401–420, Aug. 1, 1992.

"Recording –Helical–Scan Digital Video Cassette Recording System Using 6,35 mm Magnetic Tape for Consumer Use (525–60, 625–50, 1125–60 and 1252–50 systems) –Part 2: SD Format for 525–60 and 625–50 Systems", International Standard, No. 61834–2, XP 001193381, Aug. 1998.

"Enregistrement –Systemes De Magnetoscopes Numeriques A Cassette A Balayage Helicoidal Sur Bande Magnetique De 6,35 MM Pour Usage Grand Public (Systemes 525–60, 625–50, 1125–60 et 1250–50) –Partie 3: Format HD Pour Systemes 1125–60 et 1250–50 Recording" International Standard –IEC, No. 61834–3, XP–001193382, Nov. 1999.

"H.26L Test Model Long Term Number 1 (TML–2) Draft O" ITU–T Telecommunication Standarization Sector of ITU, pp. 1–23, XP–001089819, Oct. 19, 1999.

* cited by examiner

IMAGE SIGNAL ENCODING DEVICE AND IMAGES SIGNAL ENCODING METHOD

FIELD OF THE INVENTION

The present invention relates to an image signal encoding device, an image signal encoding method or the like.

DESCRIPTION OF THE PRIOR ART

In an image signal recorder for recording digital image signals, modes for recording SDTV signals include two types of modes, a standard mode and a high compression mode for long-duration recording. (The both modes are standardized in Specifications of Consumer-Use Digital VCRs of HD Digital VCR Conference, and the standard mode and the high compression mode are described in Part 2 and Part 6, respectively.)

Figure 3:
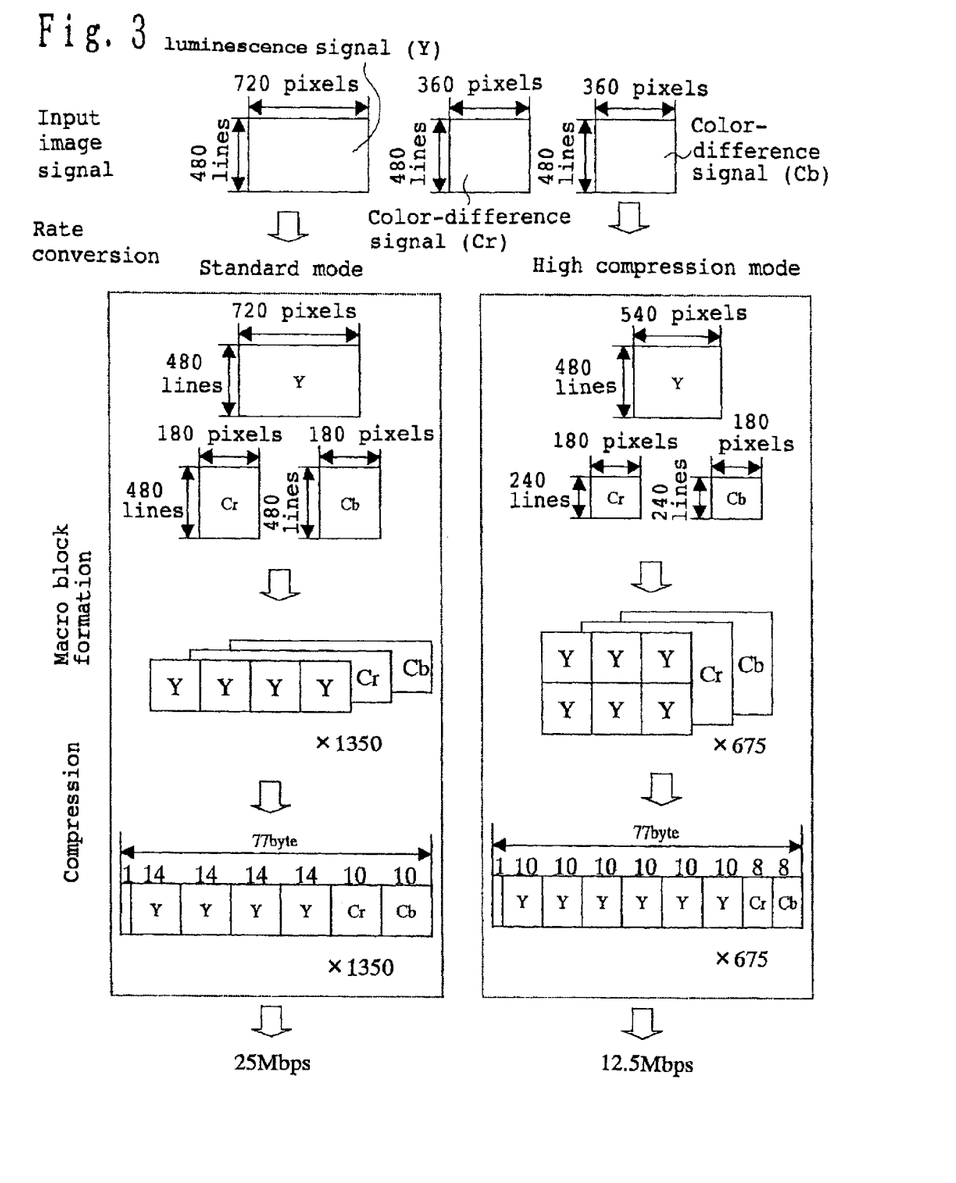
FIG. 3 is an illustrative view for illustrating a conventional example.

FIG. 3 is an illustrative view for illustrating a compressing method in a conventional example, and now explanations will be presented using FIG. 3. In each of the standard and high compression modes, rate conversion and block formation are performed in accordance with procedures described below, for input image signals equal to one frame constituted by a luminescence signal (Y) having 720 horizontal pixels and 480 vertical lines and two color-difference signals (Cr, Cb) having 360 horizontal pixels and 480 vertical lines.

First, in the standard mode, input Cr and Cb are horizontally subsampled to one-half of what they are, whereby rate conversion is performed to render the number of samples horizontal 180 pixels and vertical 480 lines. Then, with a DCT block constituted by horizontal 8 pixels and vertical 8 lines as a base, a macro block is constructed from four DCT blocks of Y and DCT blocks of Cr and Cb placed in the same position on the screen, and the input image signal is split into 1350 macro blocks. Here, a pattern constituted by four DCT blocks of Y in a horizontal direction is shown as a macro block of the standard mode in this figure, but the configuration of a rightmost macro block is slightly different. As to this., no description is presented because it is not related to the true nature of the invention.

Then, the high compression mode will be described. In the high compression mode, the input Y is subsampled to three-quarters of what it is, and Cr and Cb are subsampled horizontally to one-half and vertically to one-half of what they are to perform rate conversion. In this way, Y is rendered horizontal 540 pixels and vertical 480 lines, and Cr and Cb are rendered horizontal 180 pixels and vertical 240 lines. Then, a macro block is constructed from six DCT blocks of Y and DCT blocks of Cr and Cb placed in the same position on the screen, and the input signal is split into 675 macro blocks. Here, for the high compression mode, the macro block shown in the figure is different in configuration from the rightmost macro block as in the case of the standard mode.

For macro blocks created as described above, in both standard and high compression modes, five macro blocks positioned separately from one another on the screen are collected to form a compression unit, and then compression is performed. This compression is carried out so that a mean compressed data per one micro block is rendered 77 bytes together with additional information, namely one compression unit is rendered 385 bytes. But, because each image data of the five macro blocks consisting the compression unit is different each other, an amount of compressed date of each macro block is not necessarily the same.

Then, the one encoded macro block is made to correspond to a 77-byte block called a sync block whose area for placing data by each DCT block is predetermined as an initial value, and compressed data is placed therein, thereby creating compressed data. In this case, pieces of DCT block in one macro block is equal to that in one sync block, and the DCT block of the macro block corresponds the DCT block of the sync block with a ratio 1 to 1.

In FIG. 3, as initial values, 14 bytes and 10 bytes are assigned to the DCT block of the luminescence signal and the DCT block of the color-difference signal, respectively, at the time of the standard mode, and 10 bytes and 8 bytes are assigned to the DCT block of the luminescence signal and the DCT block of the color-difference signal, respectively, at the time of the high compression mode.

Compressed data of each DCT block of each macro block is first placed in an area of corresponding DCT block of each sync block corresponding to each macro block, and then in the case that the compressed data can not be placed in the whole area, that is, the compressed data overflows, a part of the data that can not be placed is placed the area of the other DCT block which has enough area in the same sync block.

Further, In the case that there is no DCT block which has enough area to be placed, a part of the data that can not be placed is placed the area of DCT block of other sync block which has enough area in the same compression unit.

As a consequence of encoding in this way, in the standard mode, since the input image signal of 166 Mbps is converted into that of 124 Mbps by rate conversion, which is then compressed to 25 Mbps, the compression rate for the signal after rate conversion is ⅕. In the high compression mode, on the other hand, since the input image signal is converted into that of 83 Mbps by rate conversion, which is then compressed to 12.5 Mbps, the compression rate for the signal after rate conversion is ⅙.6.

As described above, in an image signal encoding device, input sampling and macro block structures are changed, thereby making it possible to realize compression of the same signal in two modes.

However, in the aforesaid conventional example, the total number of DCT blocks in the macro block is 6 for the standard mode, but is 8 for the high compression mode, and therefore it varies for each compression mode.

Therefore, the hardware of the image signal encoding device needs to be designed such that the both patterns can be treated, thus increasing the scale of circuits.

Also, in the aforesaid conventional example, adjustment is often made so that the compression rate of red color is lower than that of blue color because color degradation is significant in the decoded signal. That is, the amount of generated codes of red-color data is greater than that of blue-color data. This has been responsible for degradation of image quality especially during high-speed playback.

SUMMARY OF THE INVENTION

The present invention has been made considering the afore said problems, and its object is to obtain an image signal encoding device, an image signal encoding method, a medium and an information aggregate, not involving increase in the scale of circuits, irrespective of types of compression modes.

Also, it is an object of the present invention to obtain an image signal encoding device, an image signal encoding method, a medium and an information aggregate, in which degradation of image quality is prevented even during high-speed playback.

One aspect of the present invention is an image signal encoding device comprising at least encoding means of dividing a luminescence signal and color-difference signals of image signals into macro blocks having a plurality of sub macro blocks and encoding data of the macro blocks with use of any one of a plurality of compression modes of which compression rate is different each other, wherein the total numbers of sub macro blocks in said each macro block are the same for the use of said all kinds of compression modes.

Another aspect of the present invention is the image signal encoding device, wherein in said macro block, the ratio between sub macro blocks of said luminescence signal and sub macro blocks of said color-difference signals varies depending on said each compression modes.

Still another aspect of the present invention is an image signal encoding device comprising at least encoding means of dividing a luminescence signal and a color-difference signal of image signals into units of macro block having a plurality of sub macro blocks, and encoding data in the macro block;

placing means of placing encoded data into sync blocks each having a predetermined number of sub sync blocks each assigned a predetermined initial amount of codes, wherein said placing means arranges the assignment of said predetermined initial amount of codes to each said sub sync block in said sync block so that that for said sub sync block of said color-difference signal of red color is different from that for said sub sync block of said color-difference signal of blue color.

Yet another aspect of the present invention is the image signal encoding device, wherein the assignment of said predetermined initial amount of codes to each said sub sync block in said sync block is defined so that that for said sub sync block of said color-difference signal of red color is greater than that for said sub sync block of said color-difference signal of blue color.

Still yet another aspect of the present invention is the image signal encoding device, wherein the assignment of said predetermined initial amount of codes to each said sub sync block in said sync block is defined so that that for sub sync block of said color-difference signal of red color equals that for sub sync block of said luminescence signal.

A further aspect of the present invention is the image signal encoding device, wherein the assignment of said predetermined initial amount of codes to each said sub sync block in said sync block is defined so that the ratio thereof among sub sync block of said luminescence signal and sub sync block of said color-difference signal of red color and sub sync block of said color-difference signal of blue color is 5:5:4.

A still further aspect of the present invention is the image signal encoding device, further comprising rate converting means of switching a kind of rate conversion with band limitation applied to said image Signals, in accordance with the type of said compression mode, wherein said encoding means equalizes the compression rates of said image signals subjected to rate-conversion, in all said compression modes.

A yet further aspect of the present invention is an image signal encoding method comprising at least an encoding step of dividing a luminescence signal and color-difference signals of image signals into macro blocks having a plurality of sub macro blocks, and encoding data of the macro blocks with use of any one of a plurality of compression modes of which compression rate is different each other, wherein the total numbers of sub macro blocks in said macro block are the same for the use of said all kind of compression modes.

A still yet further aspect of the present invention is the image signal encoding method, wherein in said macro block, the ratio between sub macro blocks of said encoded luminescence signal and sub macro blocks of said encoded color-difference signals varies depending on said each compression modes.

An additional aspect of the present invention is an image signal encoding method comprising at least an encoding step of dividing a luminescence signal and a color-difference signal of image signals into units of macro block having a plurality of sub macro blocks, and encoding data in the macro blocks;

placing steps of placing encoded data into sync blocks each having a predetermined number of sub sync blocks each assigned a predetermined initial amount of codes, wherein in said placing step, the assignment of said predetermined initial amount of codes to each said sub sync block in said sync block is arranged so that that for said sub sync block of said color-difference signal of red color is different from that for said sub sync block of said color-difference signal of blue color.

A still additional aspect of the present invention is the image signal encoding method, wherein the assignment of said predetermined initial amount of codes to each said sub sync block in said sync block is defined so that that for said sub sync block of said color-difference signal of red color is greater than that for said sub sync block of said color-difference signal of blue color.

A yet additional aspect of the present invention is the image signal encoding method, wherein the assignment of said predetermined initial amount of codes to each said sub sync block in said sync block is defined so that that for sub sync block of said color-difference signal of red color equals that sub sync block of for said luminescence signal.

A still yet additional aspect of the present invention is the image signal encoding method, wherein the assignment of said predetermined initial amount of codes to each said sub sync block in said sync block is defined so that the ratio thereof among sub sync block of said luminescence signal and sub sync block of said color-difference signal of red color and sub sync block of said color-difference signal of blue color is 5:5:4.

A supplementary aspect of the present invention is the image signal encoding method, further comprising a rate converting step of switching a kind of rate conversion with band limitation applied to said image signals in accordance with the type of said compression mode, wherein in said encoding step, the compression rates of said image signals subjected to rate conversion are equalized in all said compression modes.

A still supplementary aspect of the present invention is a program for making a computer serve as the encoding means of dividing a luminescence signal and color-difference signals of image signals into macro blocks having a plurality of sub macro blocks and encoding the macro blocks selectively in any one of a plurality of compression modes of which compressing late is different each other in the image signal encoding device.

A yet supplementary aspect of the present invention is a program for making a computer serve as all or a part of the encoding means of dividing a luminescence signal and a color-difference signal of image signals into units of macro block having a plurality of sub macro blocks, and encoding data in the macro block, and placing means of placing encoded data into sync blocks each having a predetermined number of sub sync blocks each assigned a predetermined initial amount of codes in the image signal encoding device.

An image signal encoding method of the present invention as described above is an image signal encoding method in which the input image signal is compressed in any one of the standard compression mode or the high compression mode for performing compression to lower compression rates compared to the standard compression mode, wherein a macro block consisting of two or more blocks that are the smallest units of compression for use in compression of the input image signal is configured in such a way that the number of blocks in the macro block is made constant and the rate between blocks of the luminescence signal and blocks of color-difference signal in the macro block is changed by the compression mode. In this way, even if the compression mode is changed and the configuration of the macro block is changed, the number of DCT blocks in the macro block remains the same, thus making it possible to treat the both modes without increasing the scale of circuits.

Also, another image signal encoding method of the present invention is an image signal encoding method in which the input image signal is split into macro blocks, and the macro blocks are compressed to create compressed blocks of predetermined formats, wherein the assignment of the initial amount of codes that is defined in the compressed block for block being the smallest units of compression constituting the macro block is changed by two types of signals of the input image signal; the red color signal and the blue color signal.

In this way, much of red color signals that are more apt to increase in the amount of generated codes than blue color signals can be placed in the compressed block, thus enabling improvement of image quality during high-speed playback.

Also, another image signal encoding method of the present invention is an image signal encoding method in which the input image signal is compressed in any one of the standard compression mode or the high compression mode for performing compression to lower compression rates compared to the standard compression mode, wherein the rate converting method with band limitation applied to the input image signal is changed in accordance with the compression mode, the same number of blocks being the smallest units of compression for use in compression of the input image signal subjected to the rate conversion are collected to configure the macro block, irrespective of compression modes, and the compression rate of the image signal subjected to the rate conversion is made to be the same for all the compression modes.

Also, another image signal encoding device of the invention comprises mode defining means for defining mode information about whether the compression for the input image signal is performed by the standard compression mode or the high compression mode for compression to lower compression rates compared to the standard compression mode rate converting means for changing the rate converting method with band limitation to the input image signal in accordance with the mode information, shuffling means for dividing the input image signal subjected to rate conversion into macro blocks consisting of a two or more blocks being the smallest units of compression to perform shuffling, orthogonal transforming means for subjecting blocks to discrete cosine transformation, quantizing means for quantizing the blocks subjected to orthogonal transformation, variable-length coding means for subjecting the quantized blocks to variable-length coding, and compressed data creating means for combining the blocks subjected to variable-length coding with additional information by each macro block to create compressed blocks, wherein the macro block in the shuffling means is comprised of a predetermined number of blocks, and the rate between the above described blocks of the luminescence signal and the above described blocks of the color-difference signal is changed by the mode information.

Also, another image signal encoding device of the present invention comprises shuffling means for dividing the input image signal into macro blocks consisting of two or more blocks being the smallest units of compression to perform shuffling, orthogonal transforming means for subjecting the blocks to discrete cosine transformation, quantizing means for quantizing the blocks subjected to orthogonal transformation, variable-length coding means for subjecting the quantized blocks to variable-length coding, and compressed block creating means for combining the blocks subjected to variable-length coding with additional information by each macro block to create compressed blocks, wherein the compressed block creating means changes the assignment of the initial amount of codes that is defined in the compressed block for blocks constituting the macro block, by two types of color-difference signals of the input image signal; the red color signal and the blue color signal

DESCRIPTION OF SYMBOLS

201 Input terminal
202 Compression mode setting device
203 Filter device
204 Shuffling device
205 Orthogonal transform device
206 Quantizing device
207 Variable-length coding device
208 Formatting device

DETAILED DESCRIPTION OF THE PREFERRED EMBODIMENTS

Embodiments of the present invention will be described below referring to the drawings.

(Embodiment 1)

Figure 1:
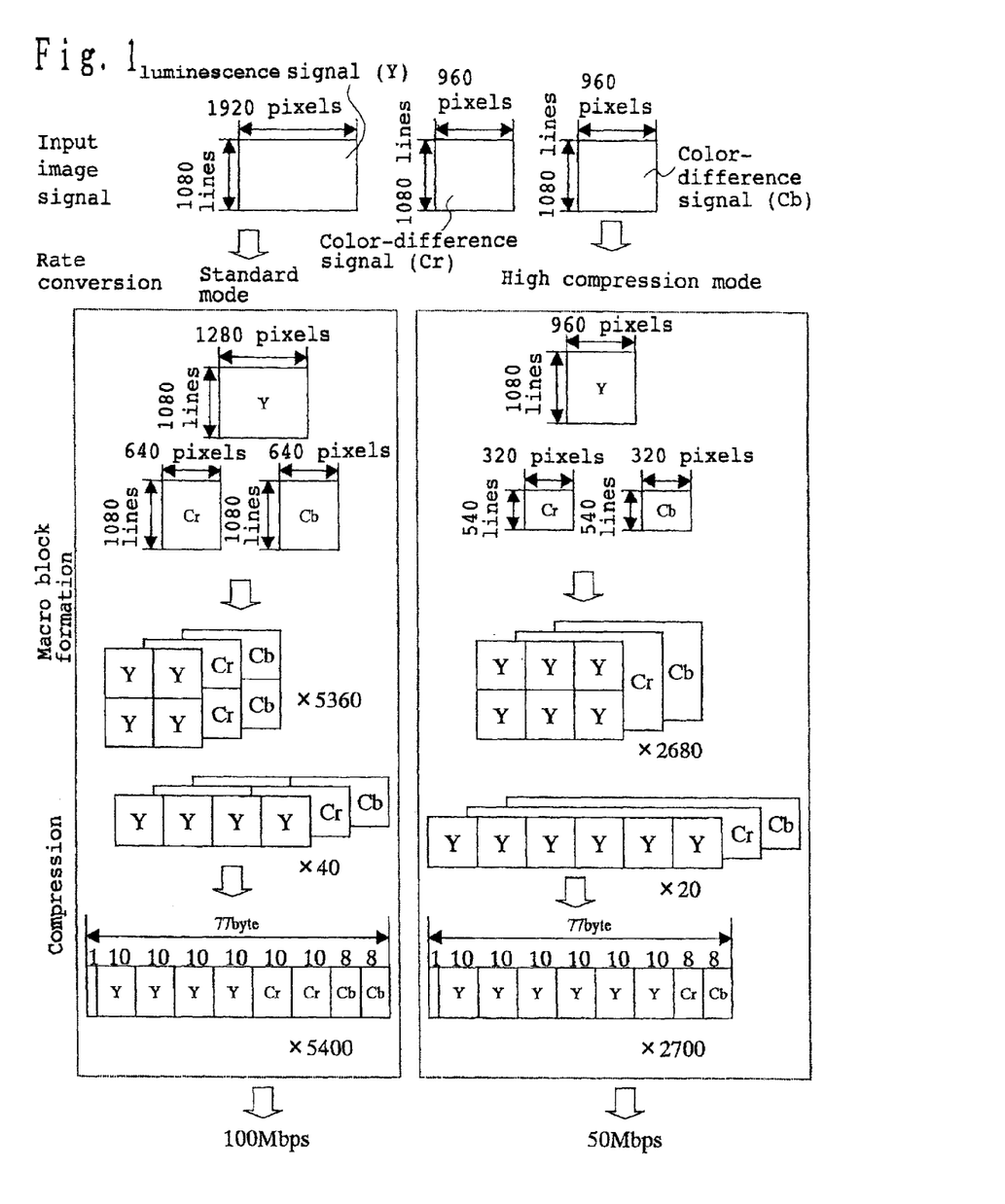
FIG. 1 is an illustrative view for illustrating Embodiment 1 of the present invention.

Embodiment 1 will be described below using the drawings. FIG. 1 is an illustrative view for illustrating an image signal encoding method of Embodiment 1 of the present invention. This embodiment also has two compression modes, a standard mode and a high compression mode, as in the case of prior arts.

First, as input image signals, a luminescence signal (hereinafter referred to as Y) having 1920 horizontal pixels and 1080 vertical lines and two color-difference signals (hereinafter referred to as Cr and Cb, respectively) having 960 horizontal pixels and 1080 vertical lines, which are equal to one frame, are inputted. First, a method of compression for this input signal in the standard mode will be described.

In the standard mode, all of Y, Cr and Cb that are input signals are rate-converted to $\frac{2}{3}$ horizontally. Thereby, the input image signals are each converted into Y having 1280 horizontal pixels and 1080 vertical lines and, Cr and Cb having 640 horizontal pixels and 1080 vertical lines.

At this time, with a sub macro block based on a DCT block consisting of horizontal 8 pixels and vertical 8 lines on the screen, a macro block (4Y+2Cr+2Cb) is constructed from four DCT blocks of Y, two DCT blocks of Cr and two DCT blocks of Cb, a total of eight DCT blocks (sub macro blocks) which are in the same position on the screen, thereby dividing the input image signal into macro blocks.

At this time, for 1072 lines from the top of the input image signal, the DCT block arrangement of Y and the DCT block arrangement of Cr and Cb in the macro block are made to be horizontal 2×vertical 2 and horizontal 1×vertical 2, respectively.

From the aforesaid operation, 80 macro blocks in the horizontal direction and 67 macro blocks in the vertical direction, a total of 5360 macro blocks are obtained. On the other hand, for the part of remaining eight lines, the DCT block arrangement of Y and the DCT block arrangement of Cr and Cb in the macro block are made to be horizontal 4×vertical 1 and horizontal 2×vertical 1, respectively. By this, 40 macro blocks in the horizontal direction and one macro block in the vertical direction, a total of 40 macro blocks are constructed.

From the afore said operation, in the standard mode, input image signals equal to one frame can be divided into 5400 macro blocks.

Now, a compression mode in the high compression mode will be described. In the high compression mode, a luminescence signal Y are rate-converted to ½ horizontally, and two color-different signals Cr and Cb are rate-converted to ⅓ horizontally and to ½ vertically, respectively. And a macro block (6Y+Cr+Cb) is constructed from six DCT blocks of Y, and DCT blocks of Cr and Cb, a total of eight DCT blocks, which are in the same position on the screen, thereby dividing the input image signal into macro blocks.

At this time, for 1072 lines from the top of the input image signal, the DCT block arrangement of Y in the macro block is made to be horizontal 3×vertical 2. By this, 40 macro blocks in the horizontal direction and 67 macro blocks in the vertical direction, a total of 2680 macro blocks are constructed.

On the other hand, for the part of remaining B lines, the DCT block arrangement of Y in the macro block is made to be horizontal 6×vertical 1, and for Cr and Cb, data of horizontal 16 pixels and vertical 8 lines is rearranged to data of horizontal 8 pixels and vertical 8 lines to construct the DCT block. By this, 20 macro blocks in the horizontal direction and one macro block in the vertical direction, a total of 20 macro blocks are constructed.

From the aforesaid operation, in the high compression mode, input image signals equal to one frame can be divided into 2700 macro blocks.

Then, in both standard and high compression modes, five macro blocks positioned separately from one another on the screen are collected to form a compression unit, as in the case of the conventional example. Compression is carried out so that one micro block is rendered 77 bytes together with additional information, namely one compression unit is rendered 385 bytes. Next, the one encoded macro block is made to correspond to one sync block of 77-byte each having a plurality of sub sync blocks each assigned with predetermined initial amount of compression and each based on DCT block, thereby placing data in the sync block to create compressed data. Here, the number of sub macro blocks in one macro block is equal to the number of sub sync block in one sync block, and a sub macro block in one macro block is corresponding to a sub sync block in one sync block, respectively.

Also, the placement of the data in the sync block is, as the conventional example, performed as follows: first, the compressed data of each sub macro block in the macro block is placed as much as possible into each predetermined sub sync block which is corresponding to each sub macro block.

Next, in the case that the whole data can not be placed in predetermined sub sync block, a part of the data that can not be placed in the predetermined sub sync block is made place to the other sub sync block which has empty area even when data of corresponding sub macro block is placed.

Here, in this embodiment, since the numbers of DCT blocks in the macro block for both standard mode and high compression mode are the same, with respect to the sum of the numbers of Y and Cr and Cb, it can be considered that structures in the sync block for recording compressed data are the same. By this, the sync block format can be shared in either standard or high compression mode, thus allowing circuit designs to be simplified.

Also, as described with the conventional example, the assignment of areas to each DCT block in the sync block is usually defined so that larger areas are assigned to Y than to Cr and Cb, but in the standard mode of this embodiment, areas as large as those assigned to Y are assigned to two DCT blocks of Cr of the color-difference signal, and, the assignment of areas to the DCT block of Cr is made larger than that of Cb. Also, the ratio of each amount of compression assigned to DCT block of Y, DCT block of Cr and DCT block of Cb in the sync block is as follows: Y:Cr:Cb=5:5:4. This is for the purpose of achieving sharing with the high compression mode, but brings about effects in addition thereto. Those aspects will be described.

A large area is assigned to Cr, thereby making it possible to record a larger amount of data of Cr in the same sync block as a matter of course. In compression involving adaptive quantization, adjustment is often made so that the compression rate for red color is lower than that for blue color because color degradation is significant. That is, data of red color is apt to increase in the amount of generated codes compared to data of blue color.

In contrast to this, as described before, by assigning more areas and assigning a larger amount of data to Cr than to Cb, image quality during high-speed playback allowing only data in the same sync block to be played back can be improved, compared to cases where Cr and Cb are recorded equally. This effect occurs in response to the assignment of areas in the sync block, and the same effect is also obtained in cases other than where two types of modes are provided as in this embodiment. For example, the same effect is obtained in realizing an image signal compression method having unique compression mode. In a word, in the present invention of image signal compression method, if a larger amount of codes are assigned to sub sync block of Cr than that of Cb in the sync block, the same result can be obtained irrespective of types of signals to be compressed and the amount of data, or sampling frequencies.

As a consequence of performing compression as described above, in the standard mode, since the input image signal of 995 Mbps is converted into that of 664 Mbps by rate conversion, which is then compressed to 100 Mbps, the compression rate for the signal after the rate conversion is ⅙.6. In the high compression mode, on the other hand, since the input image signal is converted into that of 332 Mbps by rate conversion, which is then compressed to 50 Mbps, the compression rate for the signal after the rate conversion is ⅙.6. In other words, the compression rates after rate conversion are the same for the both modes.

As described above, in the image signal encoding method of the present invention, for compressing the input image signal in two different modes, the numbers of DCT blocks in the macro block are made to be the same and the ratio of DCT blocks of the brightness and the color-difference signal are changed, thereby making it possible to treat the both compression modes without increasing the scale of circuits.

Furthermore, the configuration of macro blocks described in this embodiment is one example, and as the number of blocks constituting the macro block and the ratio of respective blocks of the luminescence signal and the color-difference signal therein, other values may be taken.

Also, with respect to sampling frequencies of the input signal, the ratio for rate conversion, the recording rate, the assignment of areas in the sync block (for example, how to place 76 bites in 77 bites, and so forth) and the number of macro blocks constituting of a compression unit, the effect of the present invention can also be achieved with values other than those shown in this embodiment. In a word, a macro block structure with consideration given to each compression rate is defined so that the number of DCT blocks in the macro block to be recorded is made to be constant, and a rate conversion ratio is defined for achieving the macro block structure with a predetermined compression rate.

(Embodiment 2)

Figure 2:
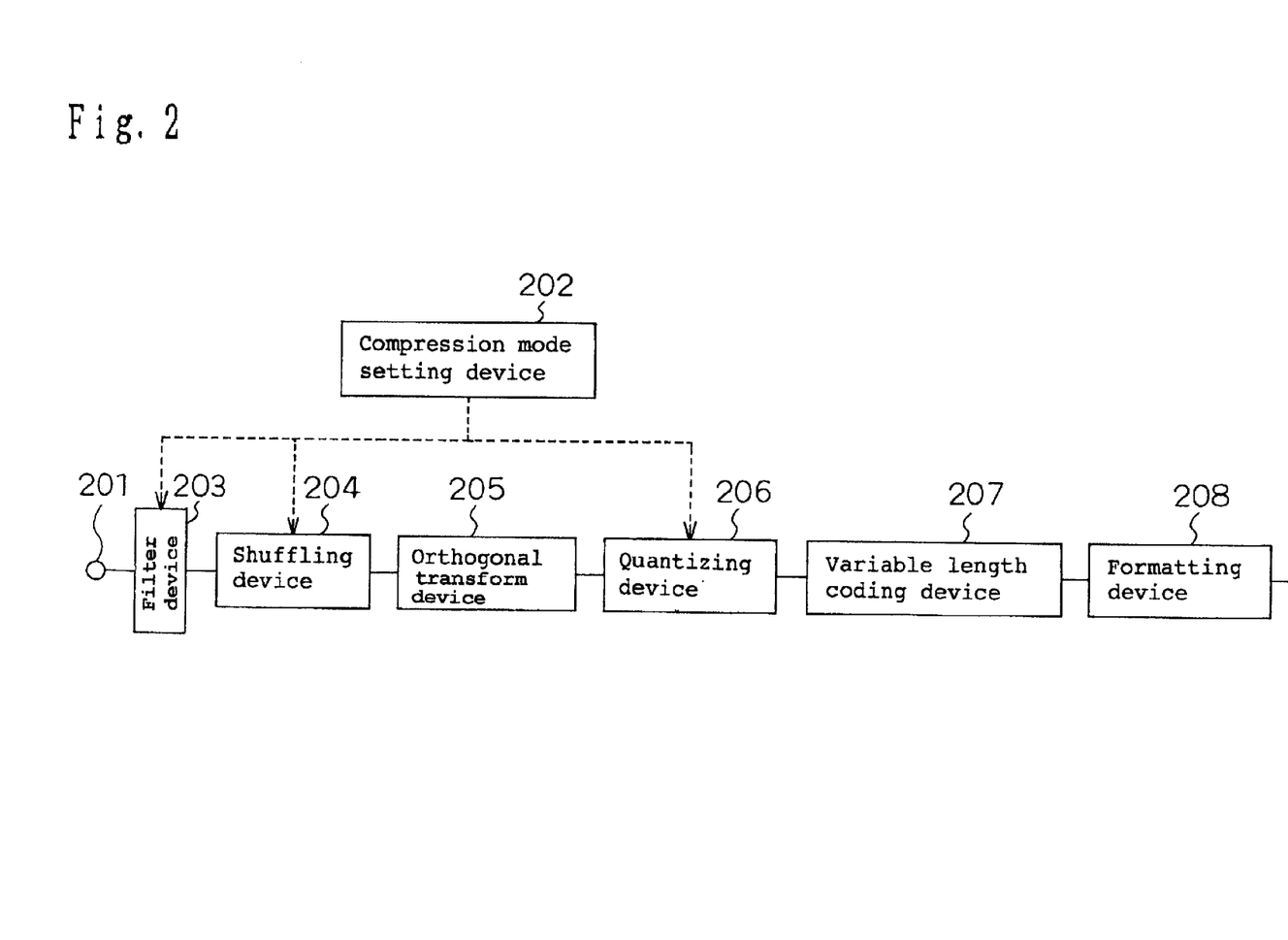
FIG. 2 is a block diagram for illustrating Embodiment 2.

Embodiment 2 of the present invention will be described below using drawings. Embodiment 2 of the present invention is one example of an image signal encoding device for achieving the image signal encoding method of Embodiment 1.

FIG. 2 is a diagram for illustrating an embodiment of a second image signal encoding device of the present invention, and in this figure, 201 is an input terminal for inputting image signals, 202 is a compression mode setting device setting a compression mode for performing coding, 203 is a filter device subjecting the input image signal to rate conversion with band limitation, 204 is a shuffling device subjecting the input signal to shuffling, 205 is an orthogonal transform device subjecting the input signal to discrete cosine transformation, 206 is a quantizing device quantizing the input signal, 207 is a variable-length coding device subjecting the input signal to variable-length coding, and 208 is a formatting device performing data placement of the input signal in the sync block. Furthermore, the filter device 203 is one example of rate converting means of the present invention, and the compression mode setting device 202, the shuffling device 204, the orthogonal transform device 205, the quantizing device 206, the variable-length coding device 207 are one example of encoding means of the present invention, and the formatting device 208 is one example of placing means of the present invention.

Operations of the image signal encoding device according to this embodiment in the above configuration will be described.

First, a compression mode for performing compression is set with the compression mode setting device 202, information thereof is outputted as mode information to the filter device 203, the shuffling device 204 and the quantizing device 206. In the filter device 203, the image signal inputted from the input terminal 201 is subjected to rate conversion with band limitation in accordance with the inputted mode information, and is outputted to the shuffling device 204. For the rate conversion here, conversion as described in Embodiment 1 is performed.

Then, in the shuffling device 204, the input signal is split into macro blocks of respective modes, followed by forming a compression unit from five macro blocks positioned separately from one another on the screen based on a pattern predetermined for each mode and outputting the compression unit. In the orthogonal transform device 205, the quantizing device 206 and the variable-length coding device 207, the input compression unit is encoded by applying thereto orthogonal transformation, quantization and variable-length coding, and is inputted in the formatting device 20B.

Here, it is for the purpose of switching adaptive quantization for improving image quality in order to optimize the adaptive quantization in each mode that the mode information is inputted in the quantizing device 206. The formatting device 208 places the input encoded image signal in a predetermined sync block together with additional information. At this time, since the sync block format is common, it is not necessary to input mode information.

As described above, the image signal is split into macro blocks corresponding to respective compression modes with the filter device 203 and the shuffling device 204, in accordance with the compression mode set by the compression mode setting device 202, thereby making it possible to achieve by the device same effects as those of Embodiment 1.

Furthermore, it is also possible to input mode information in the formatting device 208, and change and record additional information to be recorded in a fixed position of the sync block. In this case, since only a function to select information to be recorded according to the compression mode is added, there is almost no increase in the circuit volume.

Also, in this embodiment, the assignment of areas in the sync block is defined so that a larger number of red color sub sync blocks are recorded compared to blue color sub sync blocks, whereby image quality during high-speed playback can be improved, as described in Embodiment 1. in this embodiment, it is also true that the assignment of areas to the DCT block of Cr is, made larger than that of Cb. Still, the ratio of each amount of compression assigned to DCT block of Y, DCT block of Cr and DCT block of Cb in the sync block is as follows: Y:Cr:Cb=5:5:4 as like as Embodiment 1, but also in Embodiment 2, this effect occurs in response to the assignment of areas in the sync block, and the same effect is obtained even in cases other than where two types of modes are provided as in this embodiment, for example in an image signal encoding device operating in only one type of mode, which does not require mode setting and the like. In a word, if a larger number of codes are assigned to sub sync block of the red color than that of the blue color in the sync block, the same effect can be obtained irrespective of signals to be compressed and sampling.

meanwhile, although in each said Embodiment, the input image signals are compressed by using any one of two modes of standard mode and high-compression mode, the present invention of image signal compression device or image signal compression method may compress the input image signals by using of three or more compression modes.

Also, although in each said Embodiment sub macro block and sub sync block are DCT block unit, sub macro block or sub sync block of the present invention of image signal encoding device or image signal encoding method is not limited to the format of DCT unit, but can be such block having an unit of a predetermined horizontal pixels and vertical lines instead of DCT block. Further the compressing method can be DCT conversion or WAVELET conversion or the like.

Also, although in each said Embodiment the number of sub macro block in one macro block is equal to the number of sub sync block in one sync block and a sub macro block in one macro block is corresponding to a sub sync block in one sync block (the 1 to 1 correspondence), the number of sub macro blocks of macro block may be different from that of sub sync blocks of the sync block corresponding to the above macro block. That is, correspondence between the number of submacro block and that of sub sync block can be extended to be m to n correspondence (m, n are any natural number, respectively).

That is, in the case that n sub sync blocks is made to correspond to m sub macro blocks, one virtual sub macro block is made to correspond to the m sub macro blocks and one virtual sub sync block is made to correspond to the n sub sync blocks.

By above operation, since the correspondence between one virtual sub macro block and one virtual sub sync block become 1 to 1 correspondence, the compressed data in m to n correspondence can be placed as like as above-mentioned Embodiments by replacing the coresspondence of the sub macro block and the sub sync block in Embodiments with the correspondence of virtual sub macro block and virtual sub sync block. Meanwhile it is preferable that the number of sub sync block in one sync block is same, and the same sync block format is used among all compression modes.

Furthermore, the present invention the present invention is a program for making a computer execute all or part of the functions of the present invention of image signal encoding device, the program operating in collaboration with a computer.

Also, the other aspect of the embodiment in use of the program of the present invention may be a mode of being transmitted in transmission media, being read by a computer and of operating in collaboration with the computer.

Also, the recording media include ROM or the like, and the transmission media includes transmission mechanism such as optical fiber or Internet, and further light/radio waves and acoustic waves or the like.

Also, the computer of the present invention referred above is not limited pure hardware such as CPU or the like, and it may include firmware, operating system, I/O devices and peripheral devices.

Also, as explained above, the constitution of the present invention can be realized by software with easily computer or by hardware of electric circuit, logical circuit or the like.

As is evident from the description above, according to the present invention, for compressing input image signals by any one of a plurality of compression modes of which compression rate is different each other,
the numbers of sub macro blocks in a macro block are the same for the use of all kinds of compression modes, or furthermore the ratio of sub macro blocks of between luminescence signals and sub macro blocks of color-difference signals is changed, whereby the numbers of sub macro blocks in the macro block are the same even though the compression mode is changed, thus making it possible to treat all said kind of compression modes without increasing the scale of circuits.

Also, according to the present invention, high quality images can be obtained during high-speed playback.

What is claimed is:

1. An image signal encoding device comprising at least encoding means of dividing a luminescence signal and color-difference signals of image signals into macro blocks having a plurality of sub macro blocks and encoding data of the macro blocks with use of any one of a plurality of compression modes of which compression rate is different each other,
wherein the total numbers of sub macro blocks in said each macro block are the same for the use of said all kinds of compression modes.

2. The image signal encoding device according to claim 1, wherein in aid macro block, the ratio between sub macro blocks of said luminescence signal and sub macro blocks of said color-difference signals varies depending on said each compression modes.

3. An image signal encoding device comprising at least encoding means of dividing a luminescence signal and color-difference signals of image signals into units of macro block having a plurality of sub macro blocks, and encoding data in the macro block;
placing means of placing encoded data into sync blocks each having a predetermined number of sub sync blocks each assigned a predetermined initial amount of codes,
wherein said placing means arranges the assignment of said predetermined initial amount of codes to each said sub sync block in said sync block so that that for said sub sync block of said color-difference signal of red color is different from that for said sub sync block of said color-difference signal of blue color.

4. The image signal encoding device according to claim 3, wherein the assignment of said predetermined initial amount of codes to each said sub sync block in said sync block is defined so that that for said sub sync block of said color-difference signal of red color is greater than that for said sub sync block of said color-difference signal of blue color.

5. The image signal encoding device according to claim 3, wherein the assignment of said predetermined initial amount of codes to each said sub sync block in said sync block is defined so that that for sub sync block of said color-difference signal of red color equals that for sub sync block of said luminescence signal.

6. The image signal encoding device according to claim 3, wherein the assignment of said predetermined initial amount of codes to each said sub sync block in said sync block is defined so that the ratio thereof among sub sync block of said luminescence signal and sub sync block of said color-difference signal of red color and sub sync block of said color-difference signal of blue color is 5:5:4.

7. The image signal encoding device according to any one of claims 1 to 6, further comprising rate converting means of switching a kind of rate conversion with band limitation applied to said image signals, in accordance with the type of said compression mode,
wherein said encoding means equalizes the compression rates of said image signals subjected to rate-conversion, in all said compression modes.

8. An image signal encoding method comprising at least an encoding step of dividing a luminescence signal and color-difference signals of image signals into macro blocks having a plurality of sub macro blocks, and encoding data of the macro blocks with use of any one of a plurality of compression modes of which compression rate is different each other,
wherein the total numbers of sub macro blocks in said macro block are the same for the use of said all kind of compression modes.

9. The image signal encoding method according to claim 8, wherein in said macro block, the ratio between sub macro blocks of said encoded luminescence signal and sub macro blocks of said encoded color-difference signals varies depending on said each compression modes.

10. An image signal encoding method comprising at least an encoding step of dividing a luminescence signal and color-difference signals of image signals into units of macro block having a plurality of sub macro blocks, and encoding data in the macro blocks;

placing steps of placing encoded data into sync blocks each having a predetermined number of sub sync blocks each assigned a predetermined initial amount of codes, wherein in said placing step, the assignment of said predetermined initial amount of codes to each said sub sync block in said sync block is arranged so that that for said sub sync block of said color-difference signal of red color is different from that for said sub sync block of said color-difference signal of blue color.

11. The image signal encoding method according to claim 10, wherein the assignment of said predetermined initial amount of codes to each said sub sync block in said sync block is defined so that that for said sub sync block of said color-difference signal of red color is greater than that for said sub sync block of said color-difference signal of blue color.

12. The image signal encoding method according to claim 10, wherein the assignment of said predetermined initial amount of codes to each said sub sync block in said sync block is defined so that that for sub sync block of said color-difference signal of red color equals that sub sync block of for said luminescence signal.

13. The image signal encoding method according to claim 10, wherein the assignment of said predetermined initial amount of codes to each said sub sync block in said sync block is defined so that the ratio thereof among sub sync block of said luminescence signal and sub sync block of said color-difference signal of red color and sub sync block of said color-difference signal of blue color is 5:5:4.

14. The image signal encoding method according to any one of claims 8 to 13, further comprising a rate converting step of switching a kind of rate conversion with band limitation applied to said image signals in accordance with the type of said compression mode, wherein in said encoding step, the compression rates of said image signals subjected to rate conversion are equalized in all said compression modes.

15. A program for making a computer serve as the encoding means of dividing a luminescence signal and color-difference signals of image signals into macro blocks having a plurality of sub macro blocks and encoding the macro blocks selectively in any one of a plurality of compression modes of which compressing late is different each other in the image signal encoding device according to claim 1.

16. A program for making a computer serve as all or a part of the encoding means of dividing a luminescence signal and a color-difference signal of image signals into units of macro block having a plurality of sub macro blocks, and the encoding data in the macro block, and placing means of placing encoded data into sync blocks each having a predetermined number of sub sync blocks each assigned a predetermined initial amount of codes in the image signal encoding device according to claim 3.

17. In an encoder having first and second compression modes, a method of encoding an image frame including luminescence and color-difference signals, comprising the steps of:

(a) receiving the image frame;

(b) selecting one of the first and second compression modes;

(c) subsampling the image frame received in step (a) to generate blocks of pixels, in which a total number of blocks generated depends on the compression mode selected in step (b);

(d) forming multiple macro blocks from the generated blocks of step (c), in which each macro block includes a predetermined number of blocks, the number of blocks of the compression mode selected in step (b) being the same as the number of blocks of the other compression mode; and (e) compressing each macro block formed in step (d).

18. The method of claim 17 in which compressing each macro block in step (e) includes compressing each macro block using an amount of code, the amount of code used for the compression mode selected in step (b) being the same as the amount of code used for the other compression mode.

19. The method of claim 17 in which subsampling the image frame of step (c) includes subsampling the image frame to generate blocks of luminescence pixels and blocks of color-difference pixels.

20. The method of claim 17 in which step (d) of forming multiple macro blocks includes forming each macro block with luminescence blocks and color-difference blocks, and step (e) of compressing each macro block includes using an amount of code for compressing a luminescence block for the compression mode selected in step (b) that is the same as the amount of code used for compressing a luminescence block for the other compression mode.

21. The method of claim 20 in which receiving the image frame of step (a) includes receiving color-difference signals of red color and blue color, and step (e) of compressing uses a greater amount of code for compressing the red color than an amount of code for compressing the blue color.

* * * * *